W. H. FRY.
LOCK WASHER.
APPLICATION FILED DEC. 15, 1909.

1,017,528.

Patented Feb. 13, 1912.

Witnesses
Francis Boyle

Inventor
William H. Fry.
By C A Snow & Co.
Attorneys

UNITED STATES PATENT OFFICE.

WILLIAM H. FRY, OF TUSCOLA, ILLINOIS.

LOCK-WASHER.

1,017,528.  Specification of Letters Patent.  Patented Feb. 13, 1912.

Application filed December 15, 1909. Serial No. 533,196.

*To all whom it may concern:*

Be it known that I, WILLIAM H. FRY, a citizen of the United States, residing at Tuscola, in the county of Douglas and State of Illinois, have invented a new and useful Lock-Washer, of which the following is a specification.

This invention relates to nut locks, particularly to nut locking washers and has for an object to provide a washer which will operate in a new and novel manner to effectively prevent retrograde movement of the nut.

To this end the invention consists in providing the washer with a rigid segmental ratchet tooth having its upper face beveled to permit a corner of the flat working face of the nut to freely slide over the same when the nut is advanced to nearly its final position, and having its flat edge standing on a chord of the washer and perpendicular to the nut engaging face of the washer whereby to snugly engage a lateral face of the nut when the latter is advanced to its final position, there being a pair of alined rigid ribs formed on and projecting beyond the work-engaging face of the washer to engage the work and space the marginal edges of the washer therefrom so that there will be a certain resiliency of the washer to permit the segmental tooth to spring back and engage the lateral face of the nut when at the final turn of the nut the said corner of its working face has passed over the inclined surface of the tooth.

For a more detailed description of the invention reference is to be had to the accompanying drawing, in which—

Figure 1:
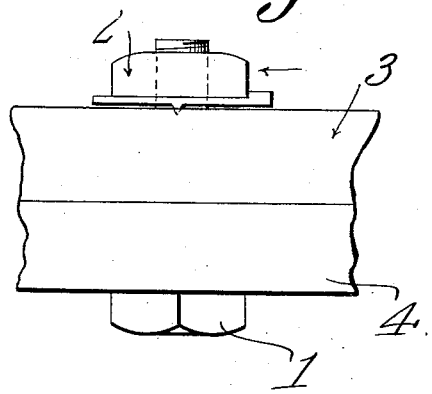
Figure 2:
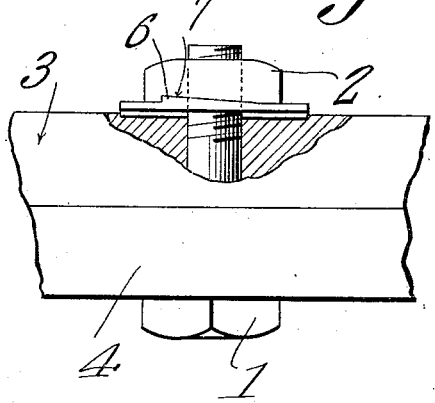
Figure 3:
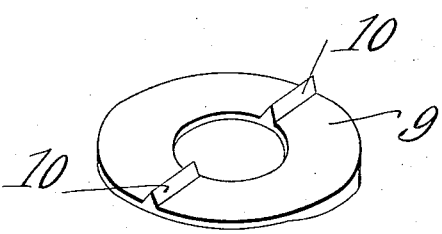
Figure 4:
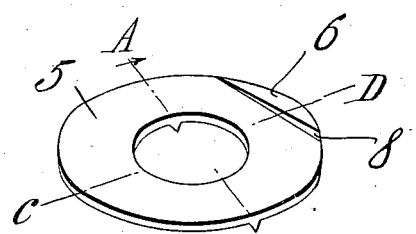
Figure 5:
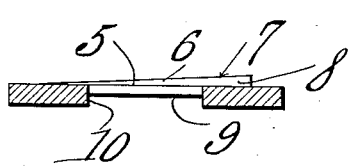
Figure 6:
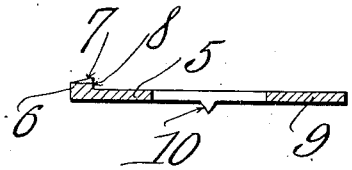

Figure 1 is a side elevation of a clamping bolt and nut equipped with my improved nut locking washer. Fig. 2 is a view in elevation of a clamping bolt and nut equipped with the nut locking washer, looking in the direction of the arrow head of Fig. 1. Fig. 3 is a perspective view of the work-engaging face of my improved nut locking washer. Fig. 4 is a perspective view of the nut engaging face of the nut locking washer. Fig. 5 is a transverse sectional view taken on the line A—B of Fig. 4. Fig. 6 is a transverse sectional view taken on the line C—D of Fig. 4.

Referring to the parts by their reference characters, 1 and 2 designate respectively any usual bolt and nut therefor, in the present instance clamping a pair of bars, 3 and 4, together.

The nut locking washer comprising the subject matter of this invention consists of a circular washer having a segmental portion of its nut engaging face 5 thickened to provide a ratchet tooth 6 formed rigid with the washer. The outer face of the ratchet tooth is inclined, as shown at 7, to provide a cam face upon which the flat working face of the nut 2 slides when the nut is advanced to nearly its final position. The flat edge 8 of the segmental ratchet tooth is disposed perpendicular to the nut-engaging face 5 of the nut locking washer and stands on a chord across it, as shown. Arranged upon the work-engaging surface 9 of the washer and formed rigid therewith is a pair of alined ribs 10 which are of the general contour shown in Fig. 3. The ribs 10 stand on a diametrical line across one face nearly parallel with the chord 8 on the other, so that the marginal edges of the work-engaging face of the washer are spaced a slight distance from the work, as clearly shown in Fig. 1. This space between the work and marginal edge of the washer permits of that edge of the washer having the segmental ratchet tooth 6 being depressed as a corner of the working face of the nut passes over the cam face 7 during the final turn of the nut upon the shank of the bolt.

The washer is constructed of resilient material so that as the corner of the nut passes beyond the ratchet tooth, the tooth bearing portion of the washer may spring back and force the flat edge 8 of the ratchet tooth into frictional contact with a flat face of the nut so that the latter is held positively against retrograde movement upon the shank of the bolt.

From the foregoing description, taken in connection with the accompanying drawing, it is thought that the construction and operation of my invention will be easily understood without a more extended explanation, it being understood that various changes may be made in the form, proportion and minor details of construction without sacrificing any of the advantages or departing from the spirit of the invention.

What is claimed is:

A nut locking washer formed in a single piece of resilient metal and having alining projections on one face forming diametrically arranged knife edges constituting bearings for engaging a structure, there being a segment projecting from the other face of the washer and gradually increasing in thickness from one end to the other, all portions of the segment being located at one side of the line of the projections and the straight edge of said segment being arranged substantially parallel with said line.

In testimony that I claim the foregoing as my own, I have hereto affixed my signature in the presence of two witnesses.

WILLIAM H. FRY.

Witnesses:
J. W. KAGEY,
EMMA PECK.

Copies of this patent may be obtained for five cents each, by addressing the "Commissioner of Patents, Washington, D. C."